(12) United States Patent
Monson et al.

(10) Patent No.: US 6,554,262 B2
(45) Date of Patent: Apr. 29, 2003

(54) WALL MOUNTED DISPLAY

(75) Inventors: Robert James Monson, St. Paul, MN (US); Trevor J. McCollough, Minneapolis, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/935,508

(22) Filed: Aug. 23, 2001

(65) Prior Publication Data

US 2003/0038224 A1 Feb. 27, 2003

(51) Int. Cl.[7] .................................................. F16M 9/00
(52) U.S. Cl. ........................................ 267/140; 267/153
(58) Field of Search .............................. 267/257, 151, 267/152, 153, 70, 116, 279, 136, 140

(56) References Cited

U.S. PATENT DOCUMENTS

| | | | | |
|---|---|---|---|---|
| 3,236,513 A | * | 2/1966 | Nicolaisen | 267/153 |
| 3,563,525 A | * | 2/1971 | Narabu | 267/140 |
| 4,059,254 A | * | 11/1977 | Fielding-Russell et al. | 293/136 |
| 4,267,792 A | * | 5/1981 | Kimura et al. | 267/153 |
| 4,905,511 A | * | 3/1990 | Reinhold | 244/117 R |
| 5,473,450 A | * | 12/1995 | Yamada et al. | 349/84 |
| 6,216,329 B1 | * | 4/2001 | Kaga et al. | 264/247 |

* cited by examiner

*Primary Examiner*—Christopher P. Schwartz
*Assistant Examiner*—Melanie Torres
(74) *Attorney, Agent, or Firm*—Patrick M. Hogan; Glenn W. Bowen

(57) ABSTRACT

A system for isolating wall hung equipment from shock and vibration including a wall mountable support or fixture having a first member for securing to a wall and a second member for securing to equipment with a plurality of triad elastomers mounted therebetween to cantileverly support the equipment and at the same time isolate the equipment from shock and vibration. The elastomer mounts while permitting displacement of the members with respect to one another inhibit the members from contacting each other when one or the other is subject to shock or vibration.

11 Claims, 2 Drawing Sheets

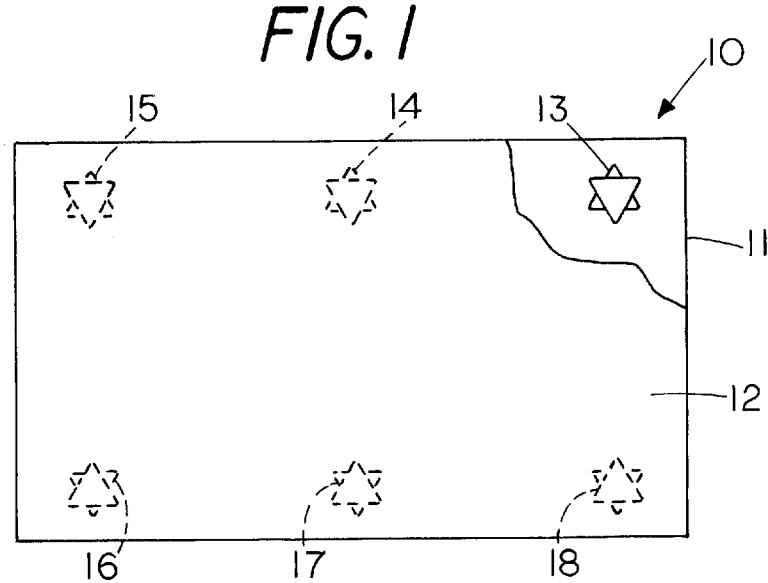
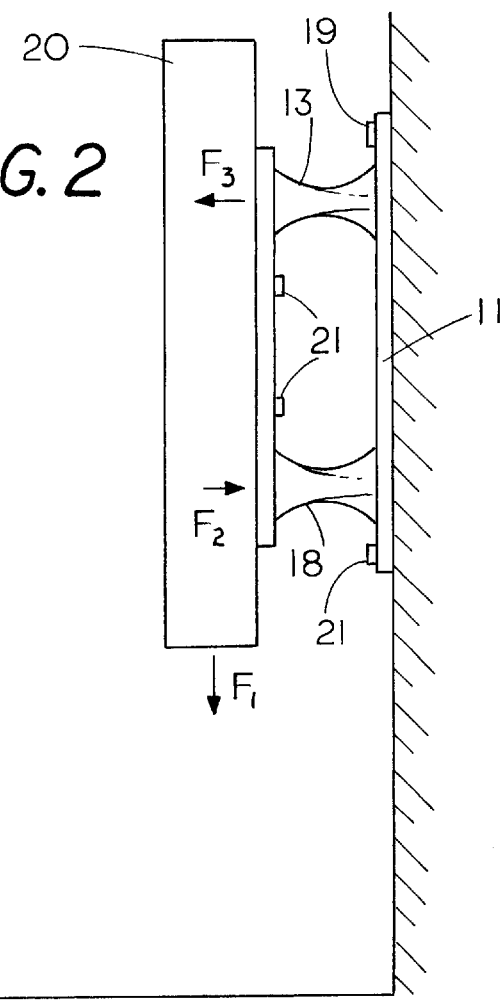

WALL MOUNTED DISPLAY

FIELD OF THE INVENTION

This invention relates generally to shock isolated systems and, more specifically, to a wall mounted display that is cantileverly supported and isolated from harmful shock and vibration forces though shear resistance of a plurality of elastomer mounts.

CROSS REFERENCE TO RELATED APPLICATIONS

None.

STATEMENT REGARDING FEDERALLY SPONSORED RESEARCH OR DEVELOPMENT

None

REFERENCE TO A MICROFICHE APPENDIX

None

BACKGROUND OF THE INVENTION

Various elastomeric materials have been used, or suggested for use, to provide shock and/or vibration damping as stated in U.S. Pat. No. 5,766,720, which issued on Jun. 16, 1998 to Yamagisht, et al. These materials include natural rubbers and synthetic resins such as polyvinyl chlorides, polyurethane, polyamides polystyrenes, copolymerized polyvinyl chlorides, and poloyolefine synthetic rubbers as well as synthetic materials such as urethane, EPDM, styrene-butadiene rubbers, nitrites, isoprene, chloroprenes, propylene, and silicones. The particular type of elastomeric material is not critical but urethane material sold under the trademark Sorbothane® is currently employed. Suitable material is also sold by Aero E.A.R. Specialty Composites, as Isoloss VL. The registrant of the mark Sorbothane® for urethane material is the Hamiltion Kent Manufacturing Company (Registration No. 1,208,333), Kent, Ohio 44240.

Generally, the shape and configuration of elastomeric isolators have a significant effect on the shock and vibration attenuation characteristics of the elastomeric isolators. The elastomeric isolators employed in the prior art are commonly formed into geometric 3D shapes, such as spheres, squares, right circular cylinders, cones, rectangles and the like as illustrated in U.S. Pat. No. 5,766,720. These elastomeric isolators are typically attached to a housing to protect equipment within the housing from the effects of shock and vibration.

In contrast to prior art devices that provide compressional support for an article, the present invention comprises a wall mountable display for cantileverly supporting articles such as display equipment or the like in a spaced condition form a support wall with a set of triad elastomers that are positioned between the wall and the equipment to cantileverly support the weight of the equipment while at the same time isolating the equipment from shock and vibration.

One of the difficulties with wall mounting sensitive equipment, such as a digital display system is to prevent the sensitive electronic equipment from receiving excessive shock and vibration from the support surface it is secured to. The shock and vibrations can come from a number of different sources. For example, excessive shock and vibrations forces can be encountered in a ship, a land vehicle or even a building which is subject to periodic earthquakes. This problem is particularly acute with costly sensitive equipment such as large screen displays which could easily be destroyed by shock and vibration forces. Because it is both costly and difficult to mount an expensive large screen display equipment in a condition that is free of harmful shocks or vibrations the safe course has been to sacrifice the quality of the more costly equipment for the lesser quality of less costly alternative equipment. For example, rear projection units are used in place of large screen digital displays in order to avoid putting a costly large screen digital display at risk from harmful shocks and vibration forces. Unfortunately, the result is that in many cases the overall system quality suffers since such systems do not provide the user the sharp image of higher quality display systems. The tradeoff of quality for costs is addressed by the present invention that provides a fixture for supporting sensitive equipment with the fixture isolating the sensitive equipment from the effects of shock and vibration forces to avoid putting the sensitive equipment at risk.

SUMMARY OF THE INVENTION

A wall mounted display including a system for isolation of wall hung equipment from harmful shock and vibration forces including a wall mountable support or fixture having a first member for securing to a wall and a second member for securing to equipment with a plurality of triad elastomers mounted therebetween to cantileverly support the weight of the equipment and at the same time isolate the equipment from shock and vibration forces through a shearing action within the elastomer mounts. The elastomer mounts, while permitting displacement of the members with respect to one another inhibit the members from contacting each other when one or the other is subject to shock or vibration.

BRIEF DESCRIPTION OF THE DRAWINGS

FIG. 1 is a front view of a wall mountable fixture with a portion of the one of the members cut away to reveal a triad elastomer used with the present invention.

FIG. 2 is a side view showing one of the members of the wall mountable fixture secured to a wall and the other member supporting a digital display system.

DESCRIPTION OF THE PREFERRED EMBODIMENTS

Figure 3:
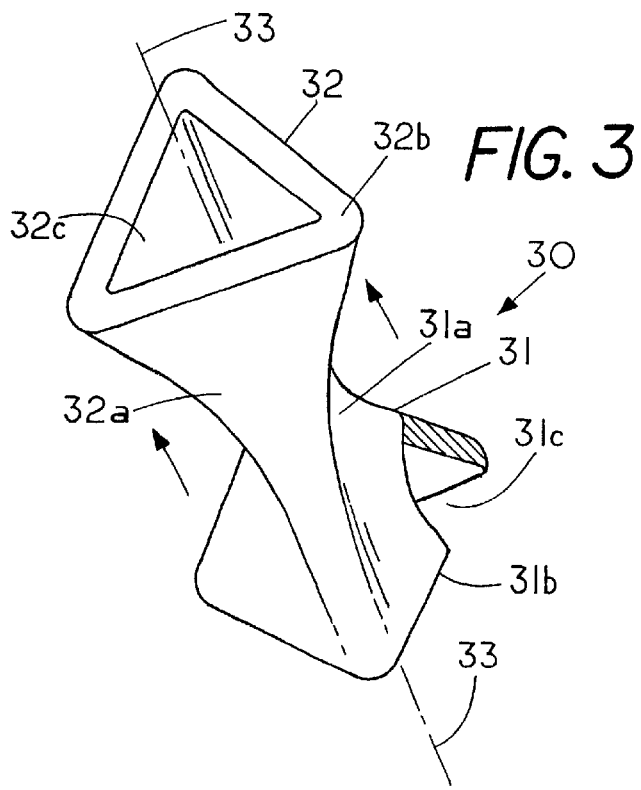
FIG. 3 is the perspective view of a double triad elastomer used in the wall mountable fixture of FIG. 1.

FIG. 1 shows a front view of a wall mountable fixture or isolator 10 having a first rigid plate member 11 positioned rearward of a second rigid plate member 12. Extending between rigid plate member 11 and rigid plate member 12 are a plurality of triad elastomers 13, 14, 15, 16, 17 and 18. The Triad elastomers are more fully described in copending application titled Double Triad Elastomer Mount filed Feb. 8, 2001, Ser. No. 09/779,423 and is herein incorporated by reference. A feature of the triad elastomers is that the compressive forces on opposite ends of the triad elastomer produce a shearing action within the elastomer mount rather than a material compression. The result is that the elastomer mounts, which act in shear mode rather than compression mode, provide effective damping of shock and vibration forces.

FIG. 2 is a side view showing fixture 11 secured to wall to 9 by fastening members 19 and 21, which may be screws bolts or the like. Secured to member 12 by fasteners 21, which may be screws bolts or the like, is a large screen display 20. Large screen display systems are known in the art and will not be described herein except to point out that such high systems are generally costly and lack the ability to withstand shocks and vibrations encountered in various environments.

FIG. 2 illustrates that the double triad elastomers provide the sole cantilever support between plate member 11 and plate member 12. With the wall mountable fixture 10 located in the position shown the weight of the large screen display 20 acts downward as indicated by force arrow $F_1$ thereby inducing a shear force to each of the cantileverly extending triad elastomers. In addition, large screen display 10 produces a slight torque as indicated by arrows $F_2$ and $F_3$. Although the torque produces a compression force on elastomer 18 and a tension force on elastomer 13 the triad elastomer responds to a compressive force by providing shear resistance. In the embodiment shown the shear forces within the elastomer mounts absorb the static weight of the large screen display 20. In addition the elastomer mounts, which are under tension or compression forces, utilize the shear resistance of the elastomer mounts to absorb energy from shock and vibration forces. While a large screen display has been illustrated the wall mountable member is suitable for use with other sensitive equipment that need to be isolated from shock and vibration.

FIG. 3 shows a pictorial view of a triad elastomer mount or single isolator 30 for providing shock and vibration attenuation while providing axially offset support. Isolator 30 is a two-tetrahedron shock isolator 30 for simultaneously isolating shocks and for cantileverly supporting a static load. Tetrahedron shock isolator 30 comprises an elastomer material, having a set of integral side walls forming a first tetrahedron isolator 31 with a tetrahedron shaped cavity 31c therein and a second tetrahedron shock isolator 32 with a tetrahedron shaped cavity 32c therein. A central axis 33 is shown extending through an apex end 32a and an apex end 31a Apex end 31a and apex end 32a are smoothly joined to each other to form a one-piece two-tetrahedron shock isolator. The top tetrahedron isolator 32 has a triangular shaped base end for forming a first support surface 32b. Similarly, the bottom tetrahedron isolator 31 has a triangular shaped base end for forming a second support surface 31b. The conjunction of the two-tetrahedron isolator provides an integral force transfer region with both the triangular shaped base ends 31a and 32a of the two-tetrahedron isolator 31 and 32 laterally offset with respect to the minimum cross-sectional area which occurs at the apex conjunction of the tetrahedron shock isolator 31 and 32. That is, a line parallel to axis 33 that extends through first support surface 32b does not extend through the conjoined region between the apex of the two-tetrahedron isolators 31 and 32. Similarly, a line parallel to axis 33 that extends through the second support surface 31b does not extend through the conjoined region between the two apexes of the two-tetrahedron isolators 31 and 32. As can be seen from FIG. 3 the support surface 32b even though identical in shape to support surface 31b are rotationally displaced from each other as well as laterally displaced from each other so compressive forces on the end of elastomer mount 30 do not produce compression forces in elastomer mount 30 but instead produce shear forces which can effectively damp shock and vibration forces.

Figure 4:
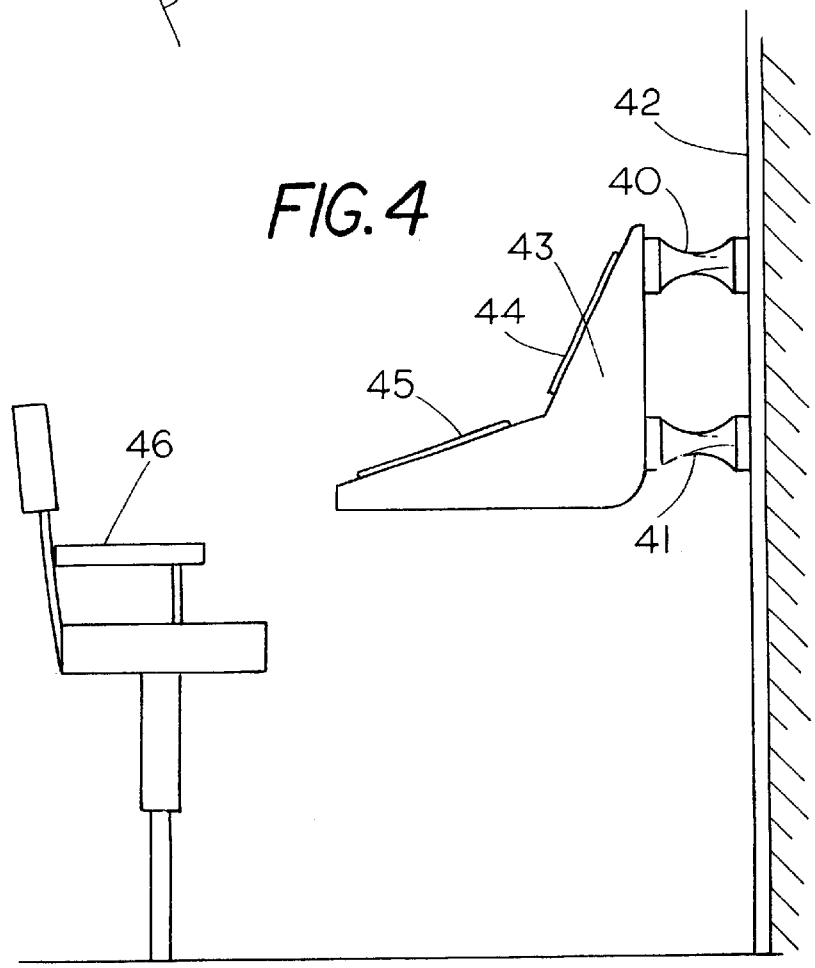
FIG. 4 is a side view of wall mounted elastomers cantileverly supporting an equipment operators chair.

FIG. 4 is a side view of another embodiment of the invention wherein a wall 42 cantileverly connects to an operators console 43. A first triad elastomer 40 has one end secured to the back of console 43 by a suitable adhesive and the other end secured to wall 42 by a suitable adhesive. Similarly, triad elastomer 41 has one end secured to the back of console 43 by a suitable adhesive and the other end secured to wall 42 by a suitable adhesive. While only two elastomers are shown, a third triad elastomer mount (not shown) is mounted thereon to provide a three point connection between the wall and the console 43. If desired, more triad elastomer mounts could be used. With the present invention one can obtain maximum shock and vibration damping by using elastomer mounts which are solely in a shear mode.

In operation of the cantilevered console 43 the operator sits on chair 46. The console 43 and keyboard 45 is positioned in front of the chair 46. In the embodiment shown one end of double triad elastomers 40 and 41 are adhesively secured directly to the console 43 and the other end of the double triad elastomer mounts are adhesively secured directly to wall member 42. That is, in certain applications the wall 42 or a portion of the equipment can be directly secured to the double triad elastomers without the use of separate plate members. In order to reduce torsional forces on an individual elastomer it is preferred to space the elastomer members laterally from each other. elastomer mounts are adhesively secured directly to wall member 42. That is, in certain applications the wall 42 or a portion of the equipment can be directly secured to the double triad elastomers without the use of separate plate members. In order to reduce torsional forces on an individual elastomer it is preferred to space the elastomer members laterally from each other.

Thus the present invention also includes a method of isolating a wall hung article from shock and vibration comprising the steps of: 1. securing a first end of a first elastomer mount to one surface of an article; 2. laterally securing a first end of a second elastomer mount to the one surface of an article; 3. securing a second end of the first elastomer to a support surface; and 4. laterally securing a second end of the second elastomer to the support surface whereby the first elastomer mount and the second elastomer mount cantileverly support the article with each of the elastomer mounts having laterally offset support surfaces to provide shear resistance to compressive forces thereon.

We claim:

1. A wall mountable display comprising:
   a first member securable to a wall;
   a second member securable to a shock sensitive article; and
   a plurality of laterally spaced apart triad elastomers providing shear resistance to an external force, each of said plurality of elastomers having a first end secured to the first member and a second end secured to the second member to support the shock sensitive article while holding the first member in a spaced distance from the second member to allow the elastomers to attenuate shock and vibration to the first member wherein at least one of the elastomer mounts is positioned vertically above another elastomer mount to reduce a torsion force on the elastomer mount.

2. The wall mountable display of claim 1 wherein the first member is rigid.

3. The wall mountable display of claim 2 wherein the second member is rigid and the first member and second member are spaced sufficiently far apart to prevent contact between the members when the first member is subject to a shock force or a vibration force.

4. The wall mountable display of claim 1 wherein the shock sensitive article is a large screen display.

5. The wall mountable display of claim 1 wherein the shock sensitive article is an operator's chair.

6. The wall mountable display of claim 1 including at least 3 elastomer mounts to reduce torsional stress on any one of the elastomer mounts.

7. The wall mountable display of claim 1 wherein the elastomer mounts are adhesively secured to their respective members.

8. The wall mountable display of claim 6 wherein the elastomer mounts comprise the sole support for the cantilever support of the article.

9. A wall mountable display for simultaneously isolating shocks and for supporting a static load comprising:
  a first triad elastomer securable to a wall; and
  a second triad elastomer securable to the wall with the first triad elastomer and the second triad elastomer cantileverly supporting a static weight of equipment in a spaced condition while simultaneously isolating the equipment from shock and vibration forces through shear resistance of the elastomers wherein each of the triad elastomers has a set of side walls forming a tetrahedron shaped isolator with a cavity therein, said tetrahedron shaped isolator having a central axis and an apex end for forming a first support surface and a base end for forming a second support surface with said first support surface and said second support surface laterally positioned with respect to each other so that a line parallel to said central axis and extending through said first support surface does not extend through said second support surface and vice versa.

10. The wall mountable display of claim 9 wherein the elastomers comprise the sole support for the equipment mounted thereto.

11. The wall mountable display of claim 10 wherein the sole elastomer resistance is provide by shear resistance within the elastomer.

* * * * *